United States Patent
Robbins et al.

(10) Patent No.: US 10,605,411 B2
(45) Date of Patent: Mar. 31, 2020

(54) METHODS FOR REDUCING TRANSMIX PRODUCTION ON PETROLEUM PIPELINES

(71) Applicant: Texon LP, Houston, TX (US)

(72) Inventors: John Colin Robbins, Houston, TX (US); Larry D. Mattingly, Houston, TX (US); Gary S. Wawak, Houston, TX (US)

(73) Assignee: Texon LP, Houston, TX (US)

( * ) Notice: Subject to any disclaimer, the term of this patent is extended or adjusted under 35 U.S.C. 154(b) by 195 days.

(21) Appl. No.: 15/652,522

(22) Filed: Jul. 18, 2017

(65) Prior Publication Data

US 2018/0023768 A1 Jan. 25, 2018

Related U.S. Application Data

(60) Provisional application No. 62/364,220, filed on Jul. 19, 2016.

(51) Int. Cl.
| | | |
|---|---|---|
| *F17D 3/05* | (2006.01) | |
| *F16K 37/00* | (2006.01) | |
| *F17D 3/10* | (2006.01) | |
| *G05D 7/06* | (2006.01) | |
| *F16K 31/06* | (2006.01) | |
| *F17D 1/08* | (2006.01) | |

(52) U.S. Cl.
CPC .......... *F17D 3/05* (2013.01); *F16K 37/0091* (2013.01); *F17D 1/08* (2013.01); *F17D 3/10* (2013.01); *G05D 7/0635* (2013.01); *F16K 31/06* (2013.01)

(58) Field of Classification Search
CPC ................ F17D 3/05; F17D 1/08; F17D 3/10
See application file for complete search history.

(56) References Cited

U.S. PATENT DOCUMENTS

| | | |
|---|---|---|
| 2,246,875 A | 6/1941 | Carney |
| 2,297,185 A | 9/1942 | Hollander et al. |
| 2,722,826 A | 11/1955 | Milligan et al. |
| 3,009,789 A | 11/1961 | Jordan et al. |
| 3,179,291 A | 4/1965 | Umbach et al. |
| 3,192,473 A | 6/1965 | Marsh |
| 3,342,199 A | 9/1967 | McEvoy |
| 3,385,680 A | 5/1968 | Feld et al. |
| 3,410,293 A | 11/1968 | Ernyei |
| 3,484,590 A | 12/1969 | Stanton |
| 3,751,644 A | 8/1973 | Mayer |

(Continued)

FOREIGN PATENT DOCUMENTS

| | | |
|---|---|---|
| CA | 2435113 B2 | 1/2005 |
| GB | 1120104 A | 8/1968 |

(Continued)

OTHER PUBLICATIONS

Jones J.D. et al., Hydrocarbon Processing (May 2000 Issue) pp. 85-89.

(Continued)

*Primary Examiner* — Matthew G Marini
(74) *Attorney, Agent, or Firm* — Clark G. Sullivan (57) ABSTRACT

Automated methods and systems for diverting transmix from a petroleum pipeline are provided to reduce the overall production of transmix on the pipeline, based on pre-defined programmed cut-points associated with the various subtypes of hydrocarbon carried on the pipeline.

15 Claims, 6 Drawing Sheets

(56) References Cited

U.S. PATENT DOCUMENTS

| | | | |
|---|---|---|---|
| 3,813,925 | A | 6/1974 | Fenske et al. |
| 3,904,508 | A | 9/1975 | Whyte, Jr. et al. |
| 3,999,959 | A | 12/1976 | Balek |
| 4,268,701 | A | 5/1981 | Vu et al. |
| 4,523,928 | A | 6/1985 | Hillman et al. |
| 4,543,819 | A | 10/1985 | Chin et al. |
| 4,876,653 | A | 10/1989 | McSpadden et al. |
| 4,882,041 | A | 11/1989 | Scott |
| 5,004,850 | A | 4/1991 | Wilson |
| 5,093,533 | A | 3/1992 | Wilson |
| 5,133,391 | A | 7/1992 | Johansson et al. |
| 5,163,586 | A | 11/1992 | Zinsmeyer |
| 5,193,594 | A | 3/1993 | Johansson et al. |
| 5,198,597 | A | 3/1993 | O'Young et al. |
| 5,208,402 | A | 5/1993 | Wilson |
| 5,271,526 | A | 12/1993 | Williams |
| 5,344,044 | A | 9/1994 | Hayden et al. |
| 5,423,607 | A | 6/1995 | Jones et al. |
| 5,430,295 | A | 7/1995 | Le Febre et al. |
| 5,542,450 | A | 8/1996 | King et al. |
| 5,823,669 | A | 10/1998 | Jones |
| 5,860,457 | A | 1/1999 | Andersson |
| 5,975,353 | A | 11/1999 | Finlayson |
| 5,979,705 | A | 11/1999 | Kaehler et al. |
| 6,026,991 | A | 2/2000 | Matthews |
| 6,109,286 | A | 8/2000 | Johnston |
| 6,161,060 | A | 12/2000 | Collins |
| 6,163,738 | A | 12/2000 | Miller |
| 6,258,987 | B1 | 7/2001 | Schmidt et al. |
| 6,328,772 | B1 | 12/2001 | Scott et al. |
| 6,540,797 | B1 | 4/2003 | Scott et al. |
| 6,679,302 | B1 | 1/2004 | Mattingly et al. |
| 7,032,629 | B1 | 4/2006 | Mattingly et al. |
| 7,631,671 | B2 | 12/2009 | Mattingly et al. |
| 8,176,951 | B2 | 5/2012 | Mattingly et al. |
| 8,192,510 | B2 | 6/2012 | Mattingly et al. |
| 8,506,656 | B1 * | 8/2013 | Turocy ............... C10L 1/10 44/300 |
| 8,597,380 | B2 * | 12/2013 | Buchanan ............. C10L 1/06 44/452 |
| 8,748,677 | B2 | 6/2014 | Buchanan |
| 9,080,111 | B1 | 7/2015 | Huff et al. |
| 2005/0022446 | A1 | 2/2005 | Brundage et al. |
| 2005/0058016 | A1 | 3/2005 | Smith et al. |
| 2006/0278304 | A1 | 12/2006 | Mattingly et al. |
| 2007/0034550 | A1 | 2/2007 | Hedrick |
| 2009/0000396 | A1 | 1/2009 | Kawanishi |
| 2010/0175313 | A1 | 7/2010 | Mattingly et al. |
| 2012/0216453 | A1 | 8/2012 | Mattingly et al. |

FOREIGN PATENT DOCUMENTS

| | | |
|---|---|---|
| WO | 92/21971 A1 | 12/1992 |
| WO | 2005057023 A1 | 6/2005 |
| WO | 07/124058 B1 | 11/2007 |
| WO | 2017/214058 A1 | 12/2017 |

OTHER PUBLICATIONS

EPA Regulatory Announcement 420-F-06-039 (May 2006).
Thermo Scientific, SOLA® II Sulfur Online Analyzer (accessed at https://assets.thermofisher.com/TFS-Assets/LSG/Specification-Sheets/D10617~.pdf on Jan. 17, 2018).
X-Ray Optical Systems, Sindie® On-Line Sulfur Analyzer (accessed at https://www.bartec.de/ProdCatalogue/Assets/Datasheets/Ing_0/Sindie_E.pdf on Jan. 17, 2018).
Jiskoot Quality Systems, In Line Blending Systems (accessed at http://www.jiskoot.com/files/1114/1691/7164/BB001_In_Line_Blending.pdf on Jan. 17, 2018).
Jiskoot Quality Systems, Ratio Blending Calculator (accessed at http://www.jiskoot.com/services/calculations/ratio-blending-index/ on Jan. 17, 2018).
EPA Q & A Date Oct. 3, 1994, Abstract.
Vanderbur; Butane Supply and Blending Agreement MCE Blending LLC, Feb. 7, 2000.
Greenfield 00165, various letters, reports and receipts dated Dec. 6, 1993 through Mar. 8, 1994.
Greenfield 00101, various internal correspondence work orders, supply agreements, Aug. 19, 1993 through Apr. 18, 1995.
Greenfield 00001, various correspondence, reports and receipts; Notice of Hearing of Appeal, Zoning Appeal Board Order, Operating and Procedures Manual Apr. 27, 1993 through Dec. 14, 1993.
Correspondence from Director of Compliance Programs, US Department of Labor to President, Mid-Continent Company Inc.; Confirmation that mixing of liquefied butane, transferred by a CTMV, with gasoline stored in atmospheric tanks at terminals is not covered by the PSM Standard dated May 17, 1995.
Correspondence from MCE Blending to U.S. Department of Labor OSHA regarding Process Safety Management Program required by OSHA; Feb. 6, 1995.
Grabner Instruments, "About Vapor Pressure Testing," from Grabner Instruments website, 2013.
Haskell, N.B. et al., Front-End Volatility of Gasoline Blend Industrial and Engineering Chemistry, vol. 34, No. 2, Feb. 1942, pp. 167-170.
Stewart, W.E., "Predict RVP of Blends Accurately," Petroleum Refiner, vol. 38, No. 6, Jun. 1959, pp. 231-234.
Standard Test Method for Vapor Pressure of Petroleum Products (Reid Method); from Organic website (http://organic.ulsan.ac.kr/reid.html), 2013.
Vazquez-Esparragoza, J. et al., "How to Estimate Reid Vapor Pressure (RVP) of Blends," Bryan Research & Engineering, Inc., website, Encyclopedia of Chemical Processing and Design, vol. 47, pp. 415-424; Hydrocarbon Processing, Aug. 1992, pp. 135-138.
Compliance Monitoring for Vapor Pressure or Vapor-Liquid Ratio Temperature, MiniVap On-line Petrolab Company website, 2013.
Sindie, "Sindie On-line Analyzer," from Sindie website, 2013.
Environmental Protection Agency, "Gasoline Blending Regulations," 40 G.F.R. § 80.27, 80.41, 80.46, 80,65, 80, 195, 80.340, no date.
Reynolds, Robert E., "The Current Fuel Ethanol Industry Transportation, Marketing, Distribution, and Technical Considerations," Downstream Alternatives Inc., May 15, 2000.
Monder, Dayadeep S., Real-Time Optimization of Gasoline Blending with Uncertain Parameters, University of Alberta, Spring 2001.
International Search Report and Written Opinion dated Mar. 5, 2010 in International Patent Application No. PCT/EP10/20207.
International Search Report and Written Opinion, dated May 2, 2014, which issued during the prosecution of International Patent Application No. PCT/US2013/038761, which corresponds to the present application.
International Search Report and Written Opinion, dated Jun. 10, 2014, which issued during the prosecution of International Patent Application No. PCT/US2013/069447, which corresponds to the present application.
Timothy R. Harbert; Automation Improvements in Batch Cutting Process: The Last Profit Center for Pipelines; American Society of Mechanical Engineers; 2008 7th International Pipeline Conference; Paper No. IPC2008-64392, pp. 623-628; 6 pages (Abstract).
Timothy R. Harbert; ULS and Transmix/regrade reduction: The last profit center for Pipelines; PAIS LLC; Publication date unknown. Accessible at http://paispecialists.net/publicacoes/transmixreduction_opis.pdf.
Third Party Submission Under 37 CFR 1.290 Concise Description of Relevance for U.S. Appl. No. 15/430,274, filed Jun. 20, 2017.
International Search Report and Written Opinion issued in corresponding International Application No. PCT/US17/42509 dated Oct. 12, 2017.
Office Action issued in corresponding Canadian Patent Application No. 2,936,755 dated Sep. 8, 2017.

\* cited by examiner

METHODS FOR REDUCING TRANSMIX PRODUCTION ON PETROLEUM PIPELINES

FIELD OF INVENTION

The present invention relates to pipeline batch shipments of products of different specifications, and the off-specification product created at their interface ("transmix"). Specifically, the invention relates to methods for reducing the volume of transmix created when shipping products of different specifications on a petroleum pipeline.

BACKGROUND OF INVENTION

Transmix is created when products of different specifications are shipped sequentially on a pipeline. The pipeline operator might ship a volume of distillate (aviation turbine fuel or Ultra Low Sulfur Diesel, etc.) followed by a volume of gasoline intended for automobiles. When these two products meet in the pipeline at an interface, a quantity of off-specification product referred to as "transmix" is created. There is no mechanical buffer used to keep the two products from mixing and becoming contaminated at this interface. The transmix does not meet approved specifications for most fuel products and cannot be used in commerce.

In the United States, pipelines ship motor gasoline, diesel fuel, jet fuel, naphtha's, LPG, diluent, butane, propane, pentane, and other hydrocarbon products on the same clean pipeline. Both refineries and petroleum terminals ship on these common carrier pipelines, in varying sizes or batches. A batch is the volume of a product shipped on the pipeline meeting a pre-defined set of product specifications. The pipeline companies and various regulatory authorities publish product specifications that shippers on the pipeline are required to meet before introducing their products into the pipeline. The pipeline company must ensure that the products it eventually releases into commerce meet these specifications. The shippers provide a certified analysis of the products to the pipeline company to verify the products meet the minimum or maximum specifications published by the pipeline company.

All multi-product pipelines create a volume of transmix that is not marketable for use in commerce. This transmix may be composed, for example, of previously certified gasoline (including previously certified gasoline blendstocks that become gasoline solely upon the addition of an oxygenate), distillate fuel (such as diesel, aviation fuel, kerosene and heating oils), and other certified product types. The problem is particularly acute when diluents, ultra-low sulfur diesel, aviation turbine fuel, and gasoline are shipped next to each other.

The United States Environmental Protection Agency ("EPA") defines interface and transmix in regulations at 40 C.F.R. 80.84, and prescribes processes that pipeline operators must follow to dispose of transmix. This transmix must typically be re-processed before it can once again be marketed in commerce. The value of transmix is thus lower than the hydrocarbon products from which the transmix derives, and it is in the commercial interest of pipelines and pipeline shippers to minimize this transmix.

Presently, pipeline operators monitor the specific gravity, flash point, haze and color of batched products to determine when transmix is present and when on-specification products are in the pipeline. Based on their standard operating procedures, the pipeline operator will direct the transmix to a transmix storage tank when it reaches a particular juncture on the pipeline, where it can be stored for eventual shipment to a transmix processing plant. Once the transmix has been completely diverted from the pipeline, and on-specification products are once again flowing past this juncture, the operator will resume the product flow through the pipeline and direct the on-specification product to other tanks in the tank farm for eventual distribution to customers and in commerce. The more time it takes for the pipeline to make the interface cut, the more transmix that is created. Again, it is in the best interest of the pipeline company to create the smallest amount of transmix as possible.

Accordingly, it is an object of the present invention to reduce the volume of transmix created on petroleum pipelines, and to maximize the retention of on-specification products for commercial distribution.

It is another object to provide methods of managing transmix that minimize the volume of transmix production during pipeline transportation while ensuring that on-specification products remain within their prescribed specifications.

A still further object is to automate the process of transmix diversion, so that transmix is diverted from the pipeline using consistent numeric criteria, and reducing the need for guesswork and significant human intervention.

SUMMARY OF THE INVENTION

After significant work and experimentation, the inventors have developed methods for tightly controlling the production of transmix on a petroleum pipeline, and thereby reducing the production of this off-specification product. The methods are performed at a juncture on a petroleum transmission pipe, by diverting the hydrocarbon flow into a transmix pipe when transmix starts flowing through the juncture, and resuming the flow through the transmission pipe when an on-specification commercial grade hydrocarbon subtype once again is flowing through the juncture. In the methods of the invention, each sub-type of hydrocarbon that generates transmix is assigned one or more specifications or "cut-points" that define the hydrocarbon subtype and distinguish it from other subtypes flowing through the pipeline. When the physical properties of the flow reach one or more of these pre-specified cut-points, the flow is diverted to the transmix pipe. When the physical properties reach the cut-points for the succeeding hydrocarbon subtype, the flow is resumed through the transmission pipe.

Thus, in a first principal embodiment the invention provides an automated method for reducing transmix production on a pipeline comprising: (a) providing a flow of hydrocarbon in a transmission pipe comprising first and second hydrocarbon subtypes in sequence separated by transmix; (b) providing a transmix pipe in fluid communication with the transmission pipe separated from the transmission pipe by a transmix valve under the control of a central processing unit; (c) repeatedly analyzing the flow for physical property measurements; (d) comparing, in the central processing unit, the measurements to a first subtype cut-point, and diverting the flow to a transmix pipe when the measurements reach the first subtype cut-point; and (e) resuming the flow through the transmission pipe when the measurements reach a second subtype cut-point.

A second principal embodiment is premised on the fact that most hydrocarbon batches are defined by a plurality of physical properties or specifications, and that all of the specifications must be satisfied to have a commercially viable hydrocarbon subtype. Thus, while the flow should be diverted to the transmix pipe upon reaching the limits of only one specification or cut-point, it should only be resumed once all of the specifications or cut-points of the succeeding batch are satisfied. Therefore, in a second principal embodiment the invention provides an automated method for reducing transmix production on a pipeline comprising: (a) providing a flow of hydrocarbon in a transmission pipe comprising first and second hydrocarbon subtypes in sequence separated by transmix; (b) providing a transmix pipe in fluid communication with the transmission pipe separated from the transmission pipe by a transmix valve under the control of a central processing unit; (c) providing first and second cut-points for different physical properties of the first subtype; (d) providing first and second cut-points for different physical properties of the second subtype; (e) repeatedly analyzing the flow for physical property measurements; (f) comparing, in the central processing unit, the physical property measurements to the first and second cut-points of the first subtype, and diverting the flow to a transmix pipe when the measurements reach the first or second cut-point of the first subtype; (g) resuming the flow through the transmission pipe when the measurements reach the first and second cut-points for the second subtype.

A third principal embodiment is premised on the use of batch sequence information to determine what hydrocarbon subtypes are flowing through the transmix juncture, to determine which set of cut-points to apply when deciding whether to divert the flow to the transmix pipe, and which set of cut-points to apply when deciding whether to resume the flow through the transmission pipe. Thus, in a third principal embodiment the invention provides an automated method for reducing transmix production on a pipeline comprising: (a) providing a flow of hydrocarbon in a transmission pipe comprising first and second hydrocarbon subtypes in sequence separated by transmix; (b) providing a transmix pipe in fluid communication with the transmission pipe separated from the transmission pipe by a transmix valve under the control of a central processing unit; (c) receiving a subtype sequence identification signal at the central processing unit identifying the first and second subtypes and the location of the first and second subtypes in the transmission pipe; (d) receiving physical property measurements of the flow passing through the valve at the central processing unit; (e) executing programmed logic in the central processing unit to: (i) determine the subtype flowing through the valve based on the subtype sequence identification signal; (ii) when the first subtype is flowing through the valve, accessing a dataset comprising a first cut-point for the first subtype and comparing the physical property measurements to the first cut-point of the first subtype; (iii) diverting the flow to the transmix pipe when a physical property measurement reaches the first cut-point of the first subtype; (iv) accessing a dataset comprising the first cut-point of the second subtype, comparing the physical property measurements to the first cut-point of the second subtype; and (v) resuming the flow through the transmission pipe when a physical property measurement reaches the first cut-point of the second subtype.

Still further embodiments related to the automated systems used to carry out the processes of the current invention. Thus, in a fourth principal embodiment the invention provides a system for reducing transmix production on a pipeline comprising: (a) a transmission pipe comprising a flow of hydrocarbon subtypes in sequence comprising a first subtype and a second subtype separated by transmix; (b) a transmix pipe in fluid communication with the transmission pipe, separated from the transmission pipe by an automated diversion valve; (c) a first analytical unit in sensory communication with the transmission pipe, for generating measurements of a physical property of the flow; (d) a central processing unit in sensory communication with the first analytical unit and the transmix valve, logically programmed to receive the measurements from the analytical unit, compare the measurements to first subtype and second subtype cut-points, signal the diversion valve to turn toward the transmix pipe when the measurements reach the first subtype cut-point, and signal the diversion valve to turn the flow toward the transmission pipe when the measurements reach the second subtype cut-point.

Additional advantages of the invention are set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

A better understanding of the present invention can be obtained when the following detailed description of the disclosed embodiments is considered in conjunction with the following drawings, in which.

DETAILED DESCRIPTION

Definitions and Use of Terms

Throughout this application, various publications are referenced. The disclosures of these publications in their entireties are hereby incorporated by reference into this application in order to more fully describe the state of the art to which this invention pertains. The references disclosed are also individually and specifically incorporated by reference herein for the material contained in them that is discussed in the sentence in which the reference is relied upon.

As used in the specification and claims, the singular forms a, an, and the include plural references unless the context clearly dictates otherwise. For example, the term "a cut-point" refers to one or more cut-points for use in the presently disclosed methods and systems. "A hydrocarbon" includes mixtures of two or more such hydrocarbons, and the like. The word "or" or like terms as used herein means any one member of a particular list and also includes any combination of members of that list.

When used herein the term "about" will compensate for variability allowed for in the petroleum industry and inherent in hydrocarbon products. In one embodiment the term allows for any variation within 5% of the recited specification or cut-point. When percentages, concentrations or other units of measure are given herein, it will be understood that the units of measure are weight percent unless otherwise stated to the contrary.

When ranges are expressed herein by specifying alternative upper and lower limits of the range, it will be understood that the endpoints can be combined in any manner that is mathematically feasible. Thus, for example, a range of from 50 or 80 to 100 or 70 can alternatively be expressed as a series of ranges of from 50 to 100, from 50 to 70, and from 80 to 100. When a series of upper bounds and lower bounds are related using the phase "and" or "or", it will be understood that the upper bounds can be unlimited by the lower bonds or combined with the lower bounds, and vice versa. Thus, for example, a range of greater than 40% and/or less than 80% includes ranges of greater than 40%, less than 80%, and greater than 40% but less than 80%.

"ASTM" refers to the American Society for Testing and Materials. Whenever a petroleum subtype is referenced herein, it will be understood that the subtype can be defined by specifications and testing methods prescribed by ASTM in its various publications. Thus, for example, aviation turbine fuel can be defined with reference to ASTM 1655-15de1, and diesel fuels can be defined with reference to ASTM D975-15c. Unless otherwise indicated, when reference is made to an ASTM standard herein, it is made in reference to the ASTM standard in effect on Jun. 1, 2016, and the ASTM standard is incorporated herein by reference.

"Programmable Logic Controller" or "PLC" when used herein, refers to a data processing system which can receive, retrieve, store, process, and output data. The PLC processes data which has been captured and encoded in a format recognizable by the data processing system. The PLC communicates with other PLC(s), information database(s), component(s), system(s) and device(s) encompassed by the methods and systems of the present invention.

"Informational database," when used herein, refers to a data storing system which can receive, store and output data. The informational database communicates with or is accessible to other informational database(s), PLC(s), component(s), system(s) and device(s) encompassed by the methods and systems of the present invention.

When data or a signal is referred to herein as being transmitted between two PLCs or an PLC and an information database, or other words of like import such as "communicated" or "delivered" are used, it will be understood that the transmission can be indirect, as when an intermediate PLC receives and forwards the signal or data. It will also be understood that the transmission can be passive or active.

The invention is defined in terms of principal embodiments and subembodiments. When an embodiment or subembodiment other than the principal embodiment is discussed herein, it will be understood that the embodiment or subembodiment can be applied to further limit any three of the principal embodiments. It will also be understood that the elements and subembodiments can be combined to create another distinct embodiment encompassed by the present invention.

When an element of a process or thing is defined by reference to one or more examples, components, properties or characteristics, it will be understood that anyone or combination of those components, properties or characteristics can also be used to define the subject matter at issue. This might occur, for example, when specific examples of an element are recited in a claim (as in a Markush grouping), or an element is defined by a plurality of characteristics. Thus, for example, if a claimed system comprises element A defined by elements A1, A2 and A3, in combination with element B defined by elements B1, B2 and B3, the invention will also be understood to cover a system defined by element A without element B, a system in which element A is defined by elements A1 and A2 in combination with element B defined by elements B2 and B3, etc.

Discussion of Principal Embodiments

The invention can be defined based on several principal embodiments which can be combined in any manner physically and mathematically possible to create additional principal embodiments. In a first principal embodiment the invention provides an automated method for reducing transmix production on a pipeline comprising: (a) providing a flow of hydrocarbon in a transmission pipe comprising first and second hydrocarbon subtypes in sequence separated by transmix; (b) providing a transmix pipe in fluid communication with the transmission pipe separated from the transmission pipe by a transmix valve under the control of a central processing unit; (c) repeatedly analyzing the flow for physical property measurements; (d) comparing, in the central processing unit, the measurements to a first subtype cut-point, and diverting the flow to a transmix pipe when the measurements reach the first subtype cut-point; and (e) resuming the flow through the transmission pipe when the measurements reach a second subtype cut-point.

In a second principal embodiment the invention provides an automated method for reducing transmix production on a pipeline comprising: (a) providing a flow of hydrocarbon in a transmission pipe comprising first and second hydrocarbon subtypes in sequence separated by transmix; (b) providing a transmix pipe in fluid communication with the transmission pipe separated from the transmission pipe by a transmix valve under the control of a central processing unit; (c) providing first and second cut-points for different physical properties of the first subtype; (d) providing first and second cut-points for different physical properties of the second subtype; (e) repeatedly analyzing the flow for physical property measurements; (f) comparing, in the central processing unit, the physical property measurements to the first and second cut-points of the first subtype, and diverting the flow to a transmix pipe when the measurements reach the first or second cut-point of the first subtype; (g) resuming the flow through the transmission pipe when the measurements reach the first and second cut-points for the second subtype.

In a third principal embodiment the invention provides an automated method for reducing transmix production on a pipeline comprising: (a) providing a flow of hydrocarbon in a transmission pipe comprising first and second hydrocarbon subtypes in sequence separated by transmix; (b) providing a transmix pipe in fluid communication with the transmission pipe separated from the transmission pipe by a transmix valve under the control of a central processing unit; (c) receiving a subtype sequence identification signal at the central processing unit identifying the first and second subtypes and the location of the first and second subtypes in the transmission pipe; (d) receiving physical property measurements of the flow passing through the valve at the central processing unit; (e) executing programmed logic in the central processing unit to: (i) determine the subtype flowing through the valve based on the subtype sequence identification signal; (ii) when the first subtype is flowing through the valve, accessing a dataset comprising a first cut-point for the first subtype and comparing the physical property measurements to the first cut-point of the first subtype; (iii) diverting the flow to the transmix pipe when a physical property measurement reaches the first cut-point of the first subtype; (iv) accessing a dataset comprising the first cut-point of the second subtype, comparing the physical property measurements to the first cut-point of the second subtype; and (v) resuming the flow through the transmission pipe when a physical property measurement reaches the first cut-point of the second subtype.

In a fourth principal embodiment the invention provides a system for reducing transmix production on a pipeline comprising: (a) a transmission pipe comprising a flow of hydrocarbon subtypes in sequence comprising a first subtype and a second subtype separated by transmix; (b) a transmix pipe in fluid communication with the transmission pipe, separated from the transmission pipe by an automated diversion valve; (c) a first analytical unit in sensory communication with the transmission pipe, for generating measurements of a physical property of the flow; (d) a central processing unit in sensory communication with the first analytical unit and the transmix valve, logically programmed to receive the measurements from the analytical unit, compare the measurements to first subtype and second subtype cut-points, signal the diversion valve to turn toward the transmix pipe when the measurements reach the first subtype cut-point, and signal the diversion valve to turn the flow toward the transmission pipe when the measurements reach the second subtype cut-point.

Discussion of Subembodiments

The invention can further be understood with reference to various subembodiments which can modify any of the principal embodiments. These subembodiments can be combined in any manner that is both mathematically and physically possible to create additional subembodiments, which in turn can modify any of the principal embodiments.

As discussed above, the invention uses cut-points associated with individual hydrocarbon subtypes to determine when to divert transmix from a transmission pipe, and when to resume the flow of hydrocarbon through the transmission pipe. One, two, three, four, or any number of cut-points can be used to define a hydrocarbon subtype or batch, but there will typically be at least two or three cut-points.

In any of the embodiments of the present invention, only one of the cut-points typically needs to be satisfied before diverting the flow to the transmix pipe, whereas all of the cut-points must be satisfied to resume the flow through the transmission pipe. Thus, any of the embodiments can further be defined by (a) providing a second cut-point for the first subtype for a different physical property than the first cut-point; (b) providing a second cut-point for the second subtype for a different physical property than the first cut-point; (c) diverting the flow to a transmix pipe when the flow reaches the first or second cut-point of the first subtype; but (d) resuming the flow through the transmission pipe when the flow reaches the first and second cut-points of the second subtype.

The invention also preferably employs batch information to determine the subtype of hydrocarbon flowing past a juncture in the transmission pipe, and the subtype to expect once the first subtype and transmix have passed the juncture. The subtype will typically be derived from batch information or a "cycle schedule" that includes the rate of flow through the transmission pipe, the time required for a hydrocarbon batch to flow past a particular juncture, and the distance of the batch from the juncture. Alternatively, the batch information can include the times when batches of hydrocarbon flowing through the pipeline will start and end passing a particular juncture.

This batch information is typically processed by a PLC to determine the hydrocarbon subtype flowing past a juncture, compare the physical property measurements at the juncture to one or more cut-points associated with the subtype, divert the flow to the transmix pipe when one or more of the cut-points is reached, compare the physical property measurements at the juncture to one or more cut-points associated with the succeeding subtype, and resume the flow through the transmission pipe once the flow reaches the cut-points of the succeeding subtype.

The methods can also be practiced when the subtypes are defined by three or more cut-points. Thus, the methods may further comprise (a) providing a third cut-point for the first subtype for a different physical property than the first and second cut-points; (b) providing a third cut-point for the second subtype for a different physical property than the first and second cut-points; (c) analyzing the flow for physical property measurements of the first, second and third cut-points of the first and second subtypes; (d) diverting the flow to a transmix pipe when the physical property measurements reach either the first or second or third cut-point of the first sub-type; but (e) resuming the flow through the transmission only when the physical property measurements reach all of the first and second and third cut-points of the second subtype.

As noted above, the methods of the present invention can be practiced in pipelines that carry multiple subtypes of hydrocarbon, and which generate transmix at multiple interfaces of these varying subtypes. Thus, the invention can also be practiced when the flow of hydrocarbon further comprises a third subtype in sequence, further comprising: (a) providing a first cut-point for the third subtype; (b) analyzing the flow for physical property measurements of the first cut-point of the second subtype and the first cut-point of the third subtype; (c) diverting the flow to the transmix pipe when physical property measurement reaches the first cut-point of the second subtype; and (d) resuming the flow through the transmission pipe when the measurements reach the third subtype first cut-point and third subtype second cut-point.

The invention can be practiced whenever transmix is generated between hydrocarbons of different subtypes, as long as the subtypes are adequately characterized by a discreet set of physical properties, and the physical properties can be analyzed fast enough to distinguish the subtypes before the transmix has completely passed the analysis point. Thus, for example, the invention can be practiced when the flow comprises three, four, five or more hydrocarbon subtypes selected from conventional gasoline, reformulated gasoline, diesel fuel, ultra-low sulfur diesel, biodiesel fuel, aviation turbine fuel, heating oil, kerosene, RBOB, PBOB, CBOB, subgrade gasoline, diluent, propane, pentane and butane. In a preferred embodiment, however, the invention is used to reduce transmix generated at the interface of two hydrocarbon subtypes selected from aviation turbine fuel, ultra-low sulfur diesel fuel, a motor gasoline, and a diluent.

Various physical properties can be used for the cut-points of the present invention. They can be defined in terms of ranges for a particular hydrocarbon subtype, maximum allowable limits, or minimum allowable limits. Thus, when the cut-point defines a ceiling on a physical property, whether in a range or maximum allowable limit, "reaching a cut-point" will occur when a physical property corresponding to the cut-point is greater than or equal to the cut-point. When a cut-point defines a floor on a physical property, whether in a range or a minimum allowable limit, "reaching a cut-point" will occur when a physical property corresponding to the cut-point is less than or equal to the cut-point.

It will also be understood that a cut-point is not reached until two or more sequential measurements for the cut-point have been satisfied. Thus, in any of the embodiments of this invention, reaching a cut-point will occur when two or more consecutive analyses of the flow yield a physical property measurement greater than or equal to the cut-point when the cut-point defines a ceiling, and a physical property measurement less than or equal to the cut-point when the cut-point defines a floor.

Preferred cut-points are physical property values selected from sulfur content, specific gravity, API gravity, haze, color and flashpoint, and combinations thereof. A preferred combination of physical properties to monitor is sulfur content, gravity (either or both of specific gravity and API gravity), and flashpoint. One or more of these physical properties can be monitored, depending on the cut-points associated with the batch flowing past the juncture, preferably at a frequency of at least every minute, 30 seconds, 15 seconds, or 10 seconds. The flow of hydrocarbon is preferably analyzed by: (a) withdrawing a sample of the flow of hydrocarbon from the transmission pipe; (b) transmitting the sample to an analyzing unit; and (c) either returning the sample to the transmission pipe, or transmitting the sample to a storage unit. A particularly suitable sulfur analyzer is the Sindie® 6010 On-line MWD XRF Analyzer by XOS® products. Flash point is suitably analyzed by a FDA-5™ Flash Point Analyzer by Bartec Top Holding GmbH, and haze is suitably monitored by the Haze Tracker™ from Automated Pipeline Instruments (APLI).

The invention is particularly well adapted to distinguishing subtypes based on the concentration of sulfur in the subtypes, when sulfur concentration is a requirement for the sub-type. Thus, for example, in another embodiment the first subtype is a high sulfur subtype and the second subtype is a low sulfur subtype, and the second subtype first cut-point comprises a sulfur content value. In still another embodiment the first subtype is a low sulfur subtype and the second subtype is a high sulfur subtype, and the first subtype first cut-point is a sulfur content value.

It will be understood that any of the features of the methods of the present invention apply equally to the systems of the present invention, and vice versa. However, certain verbiage can be employed in the description of the systems of the present invention, which is more appropriate when defining a system. Thus, in another subembodiment the system comprises a dataset comprising the first and second subtype cut-points, and a second analytical unit upstream of the first analytical unit for determining the sequence and identity of subtypes in the flow, wherein the central processing unit is further logically programmed to: (i) correlate the first subtype cut-point with the first subtype in sequence, and the second subtype cut-point with the second subtype in sequence; (ii) select the first subtype cut-point for comparison to the measurements when the diversion valve is turned toward the transmission pipe; and (iii) select the second subtype cut-point for comparison when the diversion valve is turned toward the transmix pipe.

In another subembodiment, in which the flow further comprises a third subtype in sequence, the dataset further comprises a third subtype cut-point, and the central processing unit is further logically programmed, after signaling the diversion valve to turn the flow toward the transmission pipe in response to the measurements reaching the second subtype cut-point, to: (i) correlate the third subtype cut-point with the third subtype in sequence; (ii) select the second subtype cut-point for comparison to the measurements when the diversion valve is turned toward the transmission pipe; and (iii) select the third subtype cut-point for comparison when the diversion valve is turned toward the transmix pipe.

Finally, it will be understood that a certification process can be implemented downstream of the transmix valve to confirm that flow through the transmission pipe was not resumed too early. Certification could be achieved by sampling the flow one or more times after the transmix valve is turned back toward the transmission pipe, and confirming that none of the physical properties for the flow violate any of the cut-points for the sub-type flowing through the valve.

Discussion of Depicted Embodiments

Figure 1:
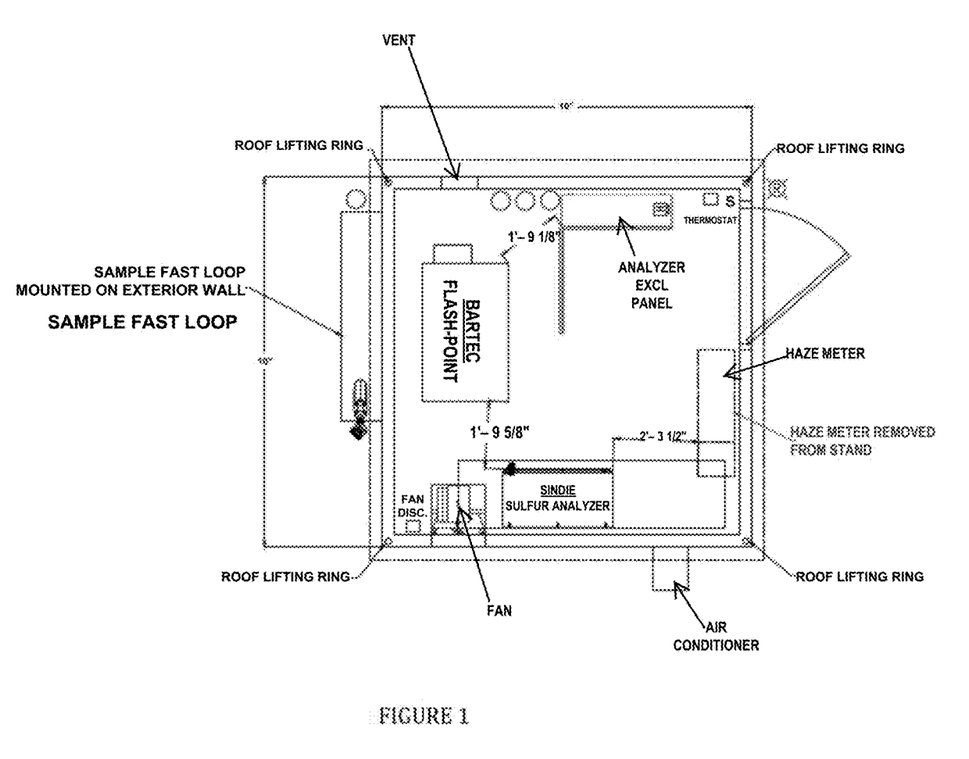
FIG. 1 is a functional block diagram illustrating the types and locations of exemplary equipment used to practice the current invention.
Figure 2:
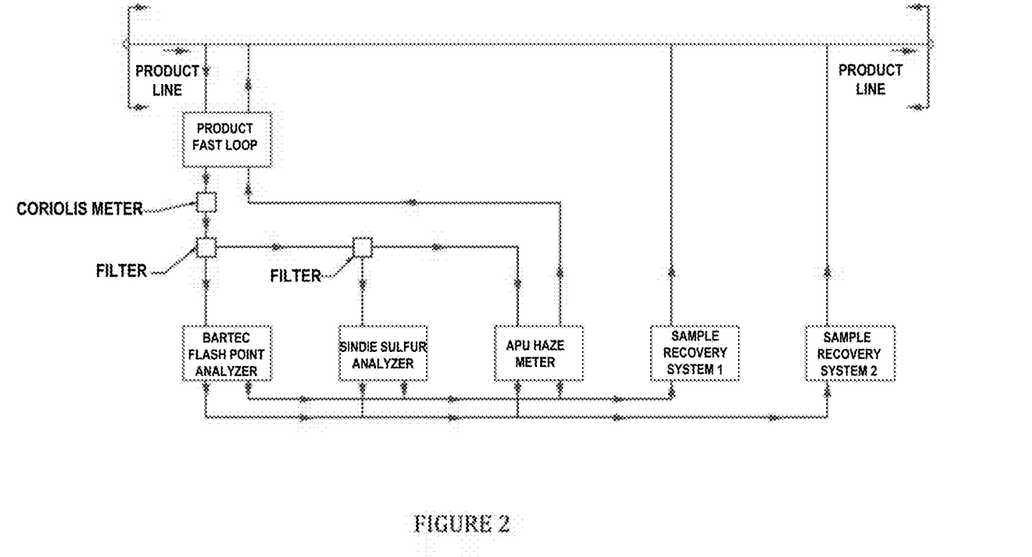
FIG. 2 is a process flow diagram illustrating a preferred method of practicing the invention.
Figure 3:
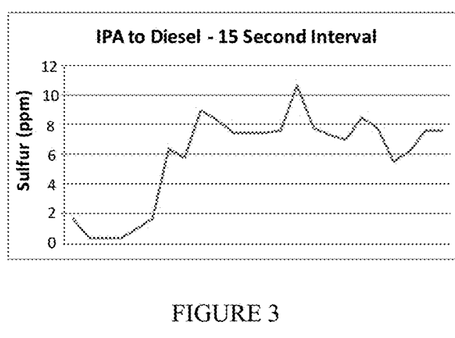
FIGS. 3-22 plot sulfur concentrations of consecutive batches of hydrocarbon subtypes in a pipeline flow simulated at laboratory scale as described in Example 2.
Figure 4:
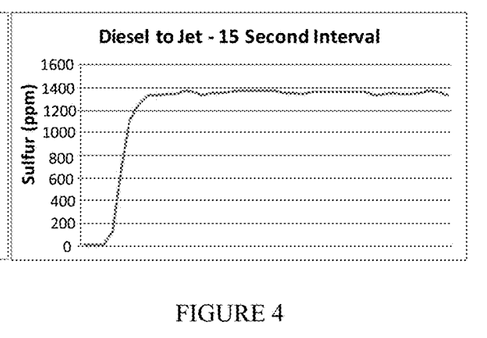
Figure 5:
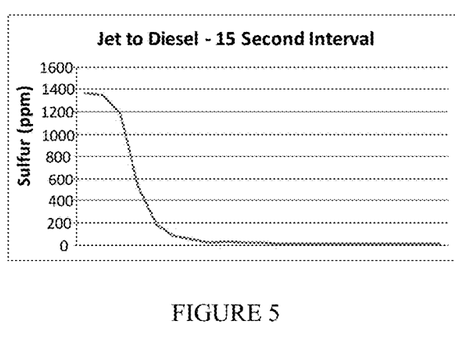
Figure 6:
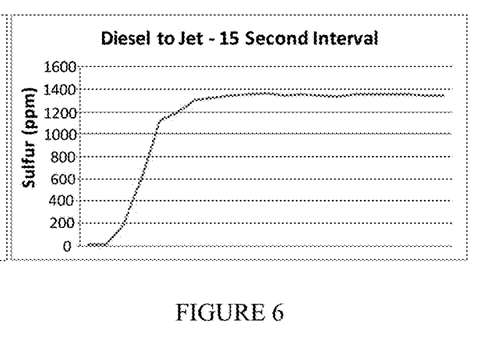
Figure 7:
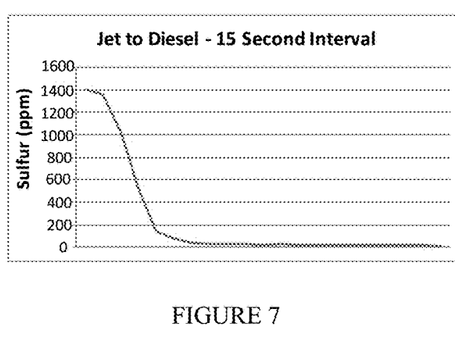
Figure 8:
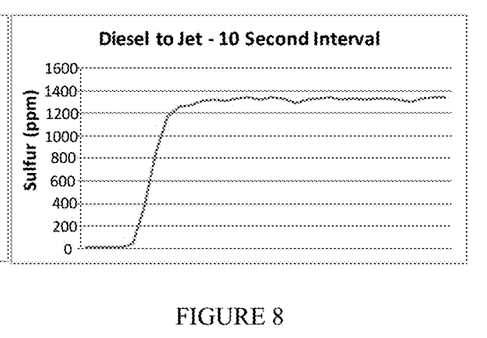
Figure 9:
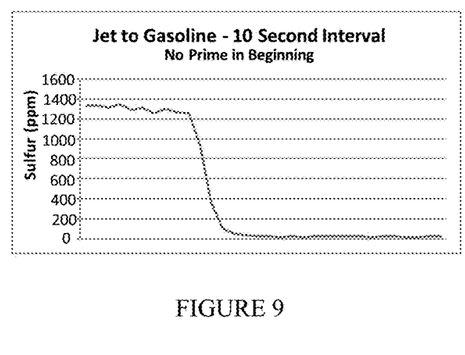
Figure 10:
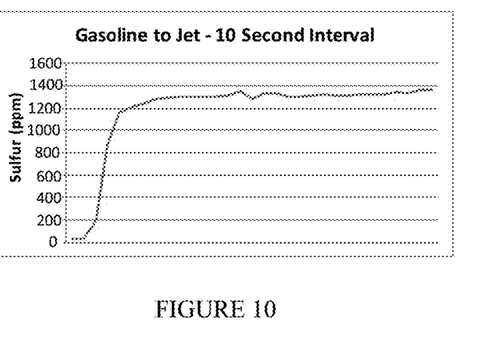
Figure 11:
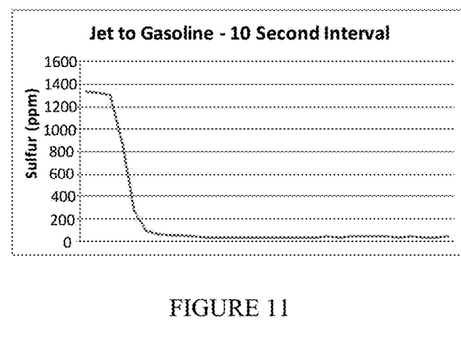
Figure 12:
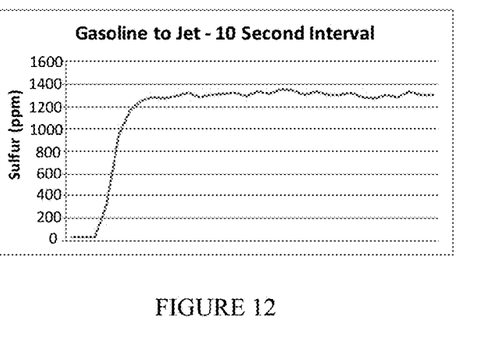
Figure 13:
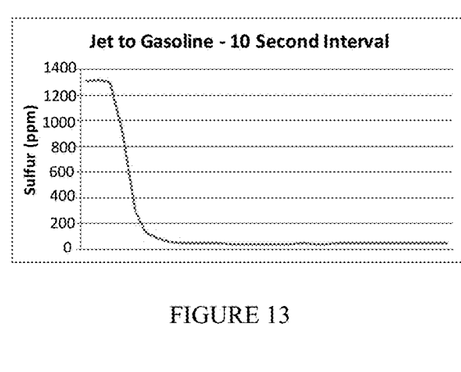

Reference is made to FIGS. 1 and 2 and the cut-points recited in Example 1 for a better understanding of how the invention can be practiced. It is to be understood that the drawings and this discussion are exemplary of the methods and systems of the present invention, and not intended to limit the scope of the invention as recited in the claims.

The invention includes providing pre-determined cut-points that ensure compliance with common carrier pipeline specifications for hydrocarbon products shipped on the pipeline. Preferred specifications define the product by specific gravity, sulfur content, haze, and flash point. When these cut-points are employed, the invention will encompass having an online specific gravity monitor, online sulfur analyzer, online haze meter monitor and online flash point analyzer. The invention will have a sample point connection on the pipeline upstream of the pipeline manifold to feed the product flowing in the pipeline to a sample product fast loop skid. The product fast loop skid will have a sample pump and motor, sample conditioning equipment, solenoid valves to control flow of the product, back-check valves, flow metering, pressure transmitter and filters. Upon product exiting the fast loop skid, product will be distributed to an analyzer building. The building will contain a process flash point analyzer, sulfur analyzer and haze meter analyzer, and optionally a specific gravity monitor.

The conditioning sample stream will flow by and into each of the individual analyzers and return back to the pipeline completing the sample product fast loop. When the conditioning streams flow by each analyzer, tubing will connect the sample stream allowing product to flow to each analyzer. Each analyzer has a sample connection to the bypass sample stream. The test sample from each analyzer is fed into tubing that flows to two sampling recovery tanks. The test sample stream is controlled by solenoid valves to direct the flow to one of two sampling recovery tanks. One sampling recovery tank will be for gasoline and gasoline-diesel fuel transmix and the other sampling recovery tank will be for diesel and diesel-jet fuel transmix.

The invention process preferably uses a Programmable Logic Controller (PLC) to control the motors, solenoid valves, analyzers, sample recovery tanks, and pumps. The PLC will also monitor pressure transmitters, meter flow transmitters, temperature transmitters, guided-wave radar leveling gauges on sample recovery tanks, hydrocarbon detectors, oxygen detectors, and all alarms for the invention.

The process flow has the PLC opening the solenoid valve to allow the sample stream to feed the product sample skid. The PLC will send a signal to start the sample skid pump and motor. On the sample skid, the PLC will monitor the flow of product from the pipeline through the Coriolis meter, will receive the specific gravity reading from the Coriolis meter monitor the pressure transmitter on the sample product line to make sure the pump has properly pressurized the sample line, control the sample product flow to each process analyzer, monitor each analyzer in order to receive test results, direct the test sample stream to the appropriate sampling recovery tank, and monitor the sampling stream flow back to pipeline. Downstream of each analyzer, the PLC will direct the sample stream flow to the appropriate sample recovery tank, and monitor the inventory in each sample recovery tank. Once the inventory in a tank reaches a fixed level the PLC will also control when to pump the recovery tank volume back into the pipeline. This will ensure the product in the pipeline is the appropriate product (matches) to pump from the sample recovery tank.

The analyzer building has a set of three process analyzers. The first analyzer is the flash point analyzer. This process analyzer will give test results between 10-15 seconds. The PLC will control the analyzer to obtain a sample from the sampling condition product line. The results from the analysis are sent to the pipeline operator station to assist in determining when to direct the flow in the pipeline to the appropriate storage tank in the petroleum terminal. The timing to activate the analyzer to take a sample will be controlled by the PLC. The PLC will monitor information provided by the pipeline operator to determine when to activate the analyzer.

The second analyzer in the building is the sulfur analyzer. This process analyzer will provide a test result between 10-15 seconds. The PLC will control the analyzer to obtain a sample from the sampling condition product line. The results from the test are sent to the pipeline operator station to assist in determining when to direct the flow in the pipeline to the appropriate storage tank in the petroleum terminal. The timing to activate the analyzer to take a sample will be controlled by the PLC. The PLC will monitor information provided by the pipeline company to determine when to activate the analyzer.

The third analyzer in the building is the haze meter analyzer. This process analyzer will provide a test result between 5-10 seconds. The PLC will control the analyzer to take a sample from the sampling condition product line. The results from the test are sent to the pipeline operator station to assist in determining when to direct the flow in the pipeline to the appropriate storage tank in the petroleum terminal. The timing to activate the analyzer to take a sample will be controlled by the PLC. The PLC will monitor information provided by the pipeline company to determine when to activate the analyzer.

EXAMPLES

In the following examples, efforts have been made to ensure accuracy with respect to numbers (e.g., amounts, temperature, etc.) but some errors and deviations should be accounted for. The following examples are put forth so as to provide those of ordinary skill in the art with a complete disclosure and description of how the methods claimed herein are made and evaluated, and are intended to be purely exemplary of the invention and are not intended to limit the scope of what the inventors regard as their invention.

Example 1

Exemplary Cut-Points

Table 1 provides exemplary physical property specifications for four different fuel types commonly transmitted on petroleum pipelines. The specifications themselves can be used as cut-points in the methods of the present invention, or values close to the specifications could also be selected depending on the pipeline's objectives. Thus, for example, if there are three sequential batches flowing through the transmission pipe, jet fuel followed by gasoline followed by jet fuel, the CPU would divert the flow to the transmix pipe once any one of the following conditions were satisfied:
  specific gravity falls below 0.775; or
  API gravity goes above 51

The CPU would divert the flow back to the transmission pipe once all three of the following conditions were satisfied:
  specific gravity falls below 0.770;
  API gravity goes above 52; and
  sulfur falls below 80 ppm
The CPU would divert the flow back to the transmix pipe when any of the following conditions was satisfied:
  specific gravity goes above 0.770;
  API gravity goes below 52; or
  sulfur goes above 80 ppm;
The CPU would divert the flow back to the transmission pipe once all of the following conditions were satisfied:
  specific gravity goes above 0.775;
  API gravity goes below 51; and
  flash point goes above 38° C.

TABLE 1

|  | Specific Gravity | API Gravity | Min FlashPoint | Max Sulfur |
| --- | --- | --- | --- | --- |
| Jet Fuel | .775-.840 | 51-37 | 38° C. | 3,000 ppm |
| Diesel Fuel | .775-.840 | 51-37 | 52° C. | 15 ppm |
| Gasoline | .710-.770 | 68-52 | — | 80 ppm |
| Diluent | .600-.775 | 104-51 | — | 2,000 ppm |

Example 2

Interface Studies

A lab-scale pipeline simulation was undertaken to determine whether the analyzing equipment selected for the invention could analyze a representative flow for sulfur with sufficient accuracy and frequency to identify transmix interfaces between various subtypes of hydrocarbon, and to discriminate between the transmix and product types. Subtypes chosen for the studies were isopropyl alcohol, aviation turbine fuel, ultra-low sulfur diesel, gasoline, diluent, and new gasoline or diesel not previously run through the system.

Figure 14:
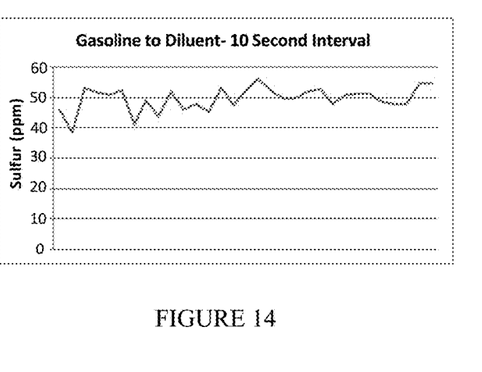
Figure 15:
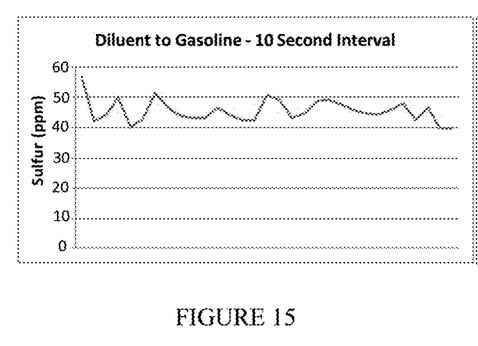
Figure 16:
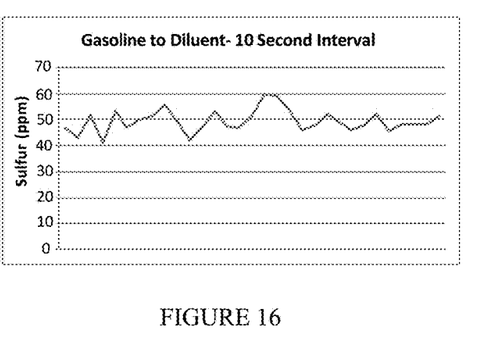
Figure 17:
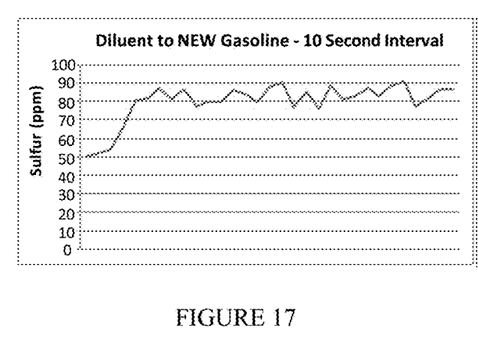
Figure 18:
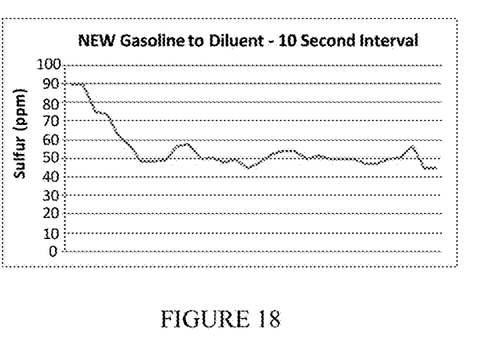
Figure 19:
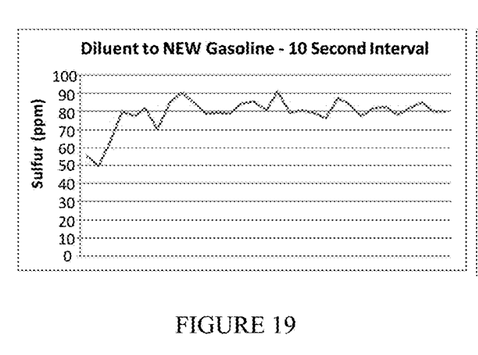
Figure 20:
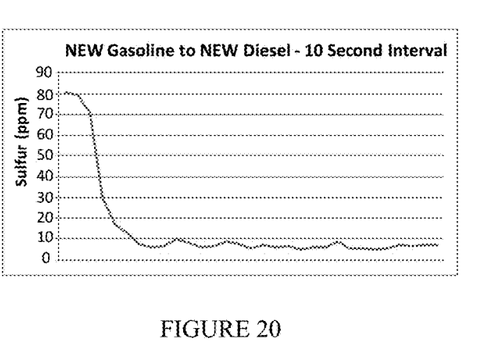
Figure 21:
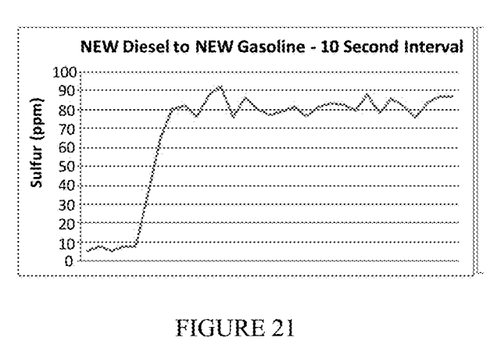
Figure 22:
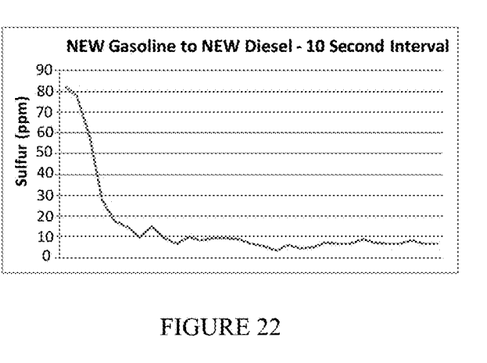

Sulfur measurements were taken every 10 or 15 seconds for all of the simulations by a Sindie® 6010 On-line MWD XRF Analyzer from XOS® Products. Sulfur concentrations in the flow are plotted in FIGS. 3 through 22 for all of the simulations. The batches transitioned from one product type to another at different rates, depending on the volume of transmix between the two batches, but the sulfur analysis was capable of discriminating between adjacent product types and defining the transmix segment between them based on sulfur concentration for most simulations. Sulfur was not able to discriminate between several batches because the sulfur content for these batches was so similar. See, e.g., FIGS. 14-16. For these batches, another cut-point would need to be employed to identify the transmix segment and discriminate between the batches such as gravity, flash point, haze or color.

Other Embodiments

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:
1. An automated method for reducing transmix production on a pipeline comprising:

a) providing a flow of hydrocarbon in a transmission pipe comprising first and second hydrocarbon subtypes in sequence separated by transmix;
b) providing a transmix pipe in fluid communication with the transmission pipe separated from the transmission pipe by a transmix diverter under the control of a central processing unit;
c) repeatedly analyzing the flow for one or more physical property measurements;
d) comparing, in the central processing unit, one of the physical property measurements to a first subtype cut-point, and diverting the flow to a transmix pipe when the physical property measurement reaches the first subtype cut-point; and
e) resuming the flow through the transmission pipe when one of the physical property measurements reaches a second subtype cut-point.

2. The method of claim 1, further comprising:
a) providing a second cut-point for the first subtype for a different physical property than the first cut-point;
b) providing a second cut-point for the second subtype for a different physical property than the first cut-point;
c) diverting the flow to a transmix pipe when the flow reaches the first or second cut-point of the first subtype; and
d) resuming the flow through the transmission pipe when the flow reaches the first and second cut-points of the second subtype.

3. The method of claim 1, wherein the flow of hydrocarbon further comprises a third subtype in sequence, further comprising:
a) providing a first cut-point for the third subtype;
b) analyzing the flow for physical property measurements of the first cut-point of the second subtype and the first cut-point of the third subtype;
c) diverting the flow to the transmix pipe when a physical property measurement reaches the first cut-point of the second subtype; and
d) resuming the flow through the transmission pipe when the measurements reach the third subtype first cut-point.

4. The method of claim 1 wherein the flow comprises three or more hydrocarbon subtypes selected from conventional gasoline, reformulated gasoline, diesel fuel, ultra-low sulfur diesel, biodiesel fuel, aviation turbine fuel, heating oil, kerosene, reformulated blendstock for oxygenate blending, premium blendstock for oxygenate blending, conventional blendstock for oxygenate blending, subgrade gasoline, diluent, propane, pentane and butane.

5. The method of claim 1 wherein the first subtype is a high sulfur subtype and the second subtype is a low sulfur subtype, and the second subtype first cut-point comprises a sulfur content value.

6. The method of claim 5, wherein the first subtype comprises aviation turbine fuel and the second subtype comprises diesel fuel.

7. The method of claim 1 wherein the first subtype is a low sulfur subtype and the second subtype is a high sulfur subtype, and the first subtype first cut-point is a sulfur content value.

8. The method of claim 7 wherein the first subtype comprises diesel fuel and the second subtype comprises aviation turbine fuel.

9. The method of claim 1 wherein the cut-points are physical property values selected from sulfur content, specific gravity, haze and flashpoint.

10. The method of claim 1 wherein:
a) physical properties are measured for aviation turbine fuels according to ASTM D1655-15d in effect on Jun. 1, 2016;
b) physical properties are measured for diesel fuels according to ASTM D975-15c in effect on Jun. 1, 2016.

11. The method of claim 1 wherein the flow is analyzed for the first cut-point of the first subtype at a frequency greater than once every 30 seconds.

12. The method of claim 1 wherein the flow of hydrocarbon is analyzed by:
a) withdrawing a sample of the flow of hydrocarbon from the transmission pipe;
b) transmitting the sample to an analyzing unit; and
c) either returning the sample to the transmission pipe, or transmitting the sample to a storage unit.

13. The method of claim 1, wherein reaching a cut-point occurs when a physical property corresponding to the cut-point is greater than or equal to the cut-point when the cut-point defines a ceiling.

14. The method of claim 1, wherein reaching a cut-point occurs when a physical property corresponding to the cut-point is less than or equal to the cut-point when the cut-point defines a floor.

15. The method of claim 1, wherein reaching a cut-point occurs when two or more consecutive analyses of the flow yield a physical property measurement greater than or equal to the cut-point when the cut-point defines a ceiling, and a physical property measurement less than or equal to the cut-point when the cut-point defines a floor.

* * * * *